UNITED STATES PATENT OFFICE.

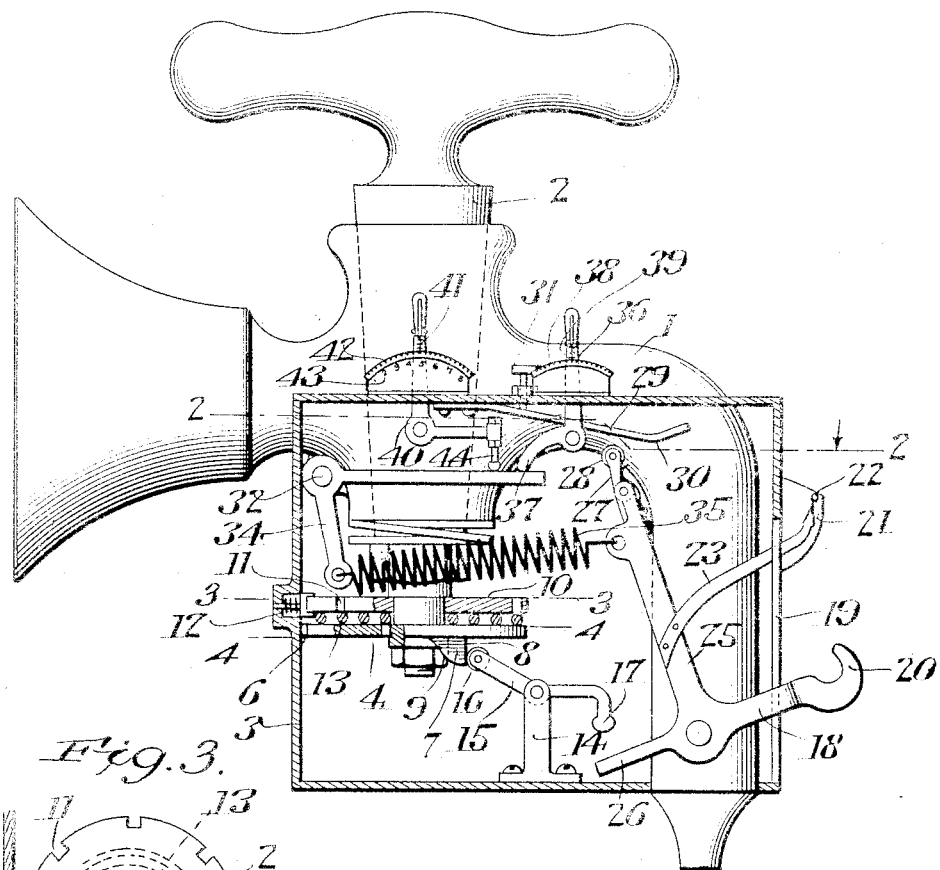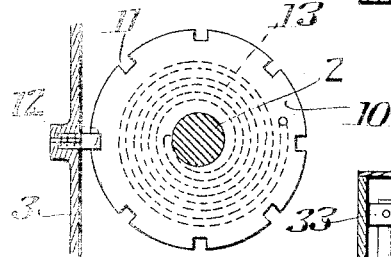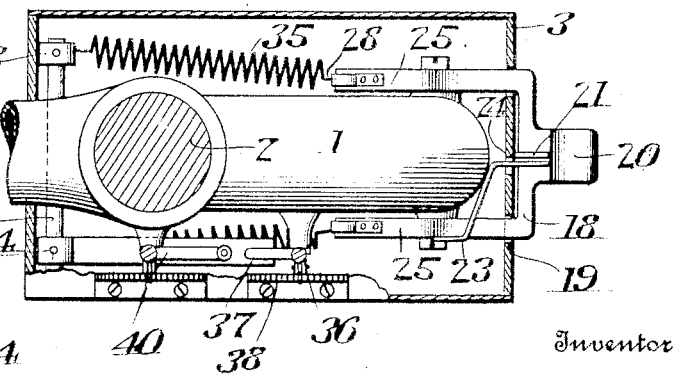

FREDERICK MARQUARDT, OF BROOKLYN, NEW YORK.

MEASURING-FAUCET.

1,207,783.   Specification of Letters Patent.   Patented Dec. 12, 1916.

Application filed August 7, 1915.   Serial No. 44,216.

*To all whom it may concern:*

Be it known that I, FREDERICK MARQUARDT, a citizen of the United States, residing at Brooklyn, in the county of Kings and State of New York, have invented new and useful Improvements in Measuring-Faucets, of which the following is a specification.

This invention relates to measuring faucets and it consists in the novel features hereinafter described and claimed.

An object of the invention is to provide in combination with a faucet of conventional type, means for automatically closing the faucet when a predetermined quantity of liquid has been drawn therefrom.

A further object of the invention is to provide means for compensating for the weight of the receptacle into which the liquid is drawn, and inasmuch as the quantity of liquid which passes through the faucet is determined by weight, the faucet may be efficiently used for drawing predetermined quantities of liquid into receptacles of different weights.

With these objects in view the invention includes a faucet having a valve turnably mounted therein, and spring means for turning the valve from an open to a closed position. A hook member is pivotally mounted upon the faucet and is adapted to receive the bail of the vessel into which the liquid is drawn. An indicator is mounted upon the hook member and is normally held at an initial position under the influence of a spring. A lever is fulcrumed upon the faucet and is connected with the said spring and means are provided for swinging the said lever, whereby the tension of the spring may be increased or diminished, as desired. A friction spring is arranged to exert its influence upon the hook member to prevent the same from moving too rapidly during its initial swinging movement and to permit the same to move rapidly during its final swinging movement. Locking means is provided for holding the valve of the faucet in an open position while the liquid is being drawn, and means is carried by the hook member for releasing the valve from the said locking means when the desired quantity of liquid has been drawn into the vessel and when it is desired that the valve should automatically close in the body of the faucet.

In the accompanying drawing:—Figure 1 is a side elevation of a faucet with the measuring device applied thereto and shown in section. Fig. 2 is a horizontal sectional view of the measuring device cut on the line 2—2 of Fig. 1. Fig. 3 is a detail sectional view of part of the device cut on the line 3—3 of Fig. 1. Fig. 4 is a similar view cut on the line 4—4 of Fig. 1.

The faucet to which the measuring device is applied comprises a body 1 having a valve 2 turnably mounted therein. A casing 3 is mounted upon the valve body 1 and incloses most of the parts of the measuring device. A disk 4 is fixed to the lower end of the valve 2 and is located in the casing 3. The disk 4 is provided at its periphery with an out-standing lug 5 adapted to encounter a lug 6 mounted at the side of the casing 3 when the valve 2 is in a closed position in the body 1. The disk 4 carries at its under side and in the vicinity of its periphery a lug 7 having one side 8 disposed at a right angle to the plane of the disk and its opposite side 9 inclined at an angle with relation to the plane of the disk.

A disk 10 is turnably mounted upon the lower portion of the valve 2 and is provided at its periphery with a series of notches 11. A spring pressed pawl 12 is movably mounted in the wall of the casing 3 and is adapted to engage in one of the notches 11 as best shown in Fig. 3 of the drawing. A coiled spring 13 lies between the disks 4 and 10, and one end of the said spring is connected with the disk 4 while the other end thereof is connected with the disk 10. It is apparent that by withdrawing the pawl 12 from that notch 11 in the disk 10 with which it is in engagement, the said disk 10 may be turned with relation to the disk 4, whereby the tension of the spring 13 may be increased or diminished as desired and when the tension of the said spring is at a proper degree, the pawl 12 may be permitted to enter one of the notches 11 in the disk 10, whereby the disk 10 is held in a fixed position but the disk 4 may be turned at times under the influence of the spring 13.

A standard 14 is mounted upon the lower side of the casing 3 and carries at its upper end a pivoted arm 15. The arm 15 is provided at one end with a journaled roller 16 and at its other end with a downwardly disposed weighted head 17. The weight of the head 17 is sufficient to hold the arm in a position whereby the roller 16 is normally held in the path of movement of the lug 7. Therefore, when the roller 16 is at an elevated position, the lug 7 may pass over the same when the inclined side thereof encounters the roller, but when the side 8 of the said lug encounters the roller the disk 4 is held against turning movement in a direction to carry the lug 7 toward the standard 14.

A hook member 18 is pivotally connected with the body 1 of the faucet in the vicinity of the discharge out-let thereof and at a point within the casing 3. The casing 3 is provided at its forward side with slots 19 through which the opposite side portions of the hook member 18 extend. The hook member 18 is provided at its outer portion with a bill 20. A plate 21 is mounted at the forward side of the casing 3 and is provided at one side with a graduation mark 22. An indicator hand 23 is disposed through a slot 24, and its outer end is adapted to move along that side of the plate 21 which is provided with the graduation 22. The hand 23 is mounted at its inner end upon one arm 25 as best shown in Fig. 1 of the drawing. The hook member 18 is provided with two arms 25, one located at each side of the faucet body 1 as shown in Fig. 2. The hook member 18 is provided at one side with an extension 26, which at times is adapted to encounter the head 17 of the arm 15. Spring pressed pawls 27 are pivotally mounted at the upper ends of the arms 25 and carry at their upper ends journaled rollers 28. These pawls have lower end portions adapted to engage the sides of the arms 25 whereby the swinging movement of the pawls in one direction is limited; however the upper ends of the pawls may swing in a direction toward the springs which bear against them. The springs which bear against the pawls 27 are mounted on the arms 25 as shown in Fig. 1. Springs 29 are mounted at the under side of the top of the casing 3 and are provided at points between their ends with downwardly disposed humps 30. Set screws 31 are threaded through the top side of the casing 3 and bear at their lower ends against the upper sides of the springs 29 as indicated in Fig. 1 of the drawing, and may be used for depressing the free ends of the springs 29 toward the arms 25, or for permitting the free ends of the said springs to move away from the said arms. A shaft 32 is journaled upon the faucet body 1 and is located within the casing 3. The said shaft 32 carries at one end an arm 33, and at its other end a bell crank lever 34. Longitudinally extensible springs 35 are connected at their forward ends with the arms 25, and at their rear ends one of the springs 35 is connected with the lowermost arm of the bell crank lever 34 and the other spring 35 is connected with the lower portion of the arm 33. The springs 35 are under tension with a tendency to hold the upper ends of the arms 25 toward the shaft 32. A lever 36 is fulcrumed at the side of the faucet body 1 and the upper end of the said lever extends through the top of the casing 3. The lever 36 is provided at its lower end with an angular extension 37 which is normally engaged by the upper arm of the bell crank lever 34 as best shown in Fig. 1 of the drawing. A dentate segment 38 is mounted upon the top of the casing 3 and the lever 36 is provided with a spring pressed pawl 39 adapted to engage the teeth of the segment 38.

A bell crank lever 40 is mounted at the side of the casing 3 and the upper arm of the said lever extends through the top of the casing 3 and is provided with a spring pressed pawl 41 adapted to engage the teeth of a dentate segment 42 also mounted upon the top of the casing 3. The segment 42 is provided at its side with a series of graduations 43. A pin 44 is adjustably mounted at the lower arm of the lever 40 and at times is adapted to be encountered by the upper arm of the bell crank lever 34.

The operation of the measuring device is as follows: The bail of a bucket (not shown) is engaged over the bill 20 of the hook member 18, whereby the body of the bucket is disposed below the discharge outlet of the body 1 of the faucet. When the bucket is connected with the hook member 18 as stated, the weight of the bucket swings the hook member, whereby the arm 25 is carried along the plate 21 and away from the graduation 22. The operator then swings the lever 36 whereby its extension 37 is moved along the upper arm of the bell crank lever 34 and the upper arm of the said lever is depressed and the springs 35 are stretched or additionally tensioned. The swinging movement of the lever 36 is continued until the end of the indicator hand 23 is brought back to the graduation mark 22 upon the plate 21. The operator then grasps the handle at the upper end of the valve 2 and turns the said valve to open position, as shown in Fig. 1, whereby the lug 5 upon the periphery of the disk 4 is moved away from the lug 6 at the back of the casing 1 and the lug 5 assumes the position shown in Fig. 4 of the drawing. During the aforesaid movement on the part of the disk 4, the inclined side 9 of the lug 7 rides over the roller 16 at the upper end of the arm 15 and as soon as the side 8 of the lug 7 passes beyond the roller 16, the arm 15 acting under the weight of the head 17 moves the roller 16 into contact with the side 8 of the lug 7 as shown in Fig. 1. Thus the valve 2 is locked in an open position and the liquid may flow through the body of the faucet 1 and enter the vessel which is supported from the hook member 18. As the said vessel increases in weight owing to the accumulation of the liquid therein, the hook member 18 is swung and the arms 25 are moved, whereby the rollers 28 carried at the upper ends of the pawls 27, engage the lower sides of the springs 29. As the arms 25 continue their swinging movement the springs 29 are flexed in an upward direction until the rollers 28 arrive at the lowest points of the humps 30. Then, as the rollers 28 continue to move beyond the humps and toward the free ends of the springs 29, the upper ends of the arms 25 are held toward the shaft 32 under the influence of the springs 35 only. Consequently the bucket and contents attached to the hook member may descend more rapidly during its final movement than at its initial movement and this will cause the extension 26 to strike the head 17 of the arm 15, whereby the head 17 is elevated and the roller 16 at the upper end of the arm 15 is depressed and carried below the lower end of the lug 7. Thus the lug 7 and disk 4 are released and under the influence of the spring 13, the said disk 4 and the valve 2 are turned, whereby the valve is moved to a closed position in the faucet body 1. As the valve 2 turns as just described, the lug 5 is brought into engagement with the lug 6 at the back of the casing 3, and the turning movement of the valve 2 is checked.

After the bail of the bucket is disengaged from the bill 20 the tension of the springs 35 comes into play and the arms 25 are drawn back to the position shown in Fig. 1. During this movement the pawls 27 swing on their pivotal connections with the arms 25 and against the springs which bear against them, so that the said arms pass without undue friction under the humps 30 of the springs 29 and when the pawls move inwardly beyond the humps 30 the springs which bear against the pawls cause them to assume the position shown in Fig. 1. The bill 20 of the hook member 18 is sufficiently long and so shaped as to prevent the bail of the bucket or vessel from falling from the said bill during the swinging movement of the hook member.

Sometimes it may be desired to supply uniform quantities of liquid to vessels which may differ from each other in weight and when this is the case the vessel is hung upon the hook member 18 whereby the hand 23 is moved along the plate 21 to a particular graduation thereon. This elongates the springs 35 and they in turn swing the lever 34. The lever 40 is then swung until the pin 44 touches the lever 34. The pawl 41 is then permitted to engage the teeth of the segment 42 at one of the graduations 43 thereon which will indicate approximately the weight of the said vessel. The lever 36 is then swung to further depress the upper portion of the lever 34 to additionally increase the tension of the springs 35 to compensate for the weight of the liquid which is to run into the vessel. Thus it will be seen that the extent of movement of the lever 40 will indicate the weight of the vessel and the extent of movement of the lever 36 will indicate the weight of the contents of the vessel. When the predetermined quantity of liquid has accumulated in the bucket or vessel, the arms 25 are swung as hereinbefore described and the other parts coöperate as indicated, to effect the automatic closing of the valve 2 in the body 1. Therefore it will be seen that an automatic closing and measuring faucet is provided and that the parts mutually coöperate with each other in an efficient manner to permit predetermined quantities of liquid to be drawn and this may also be accomplished irrespective of the relative weight of the vessel provided for the reception of the liquid.

Having described the invention what is claimed is:—

1. In combination with a faucet body having a valve turnably mounted therein, spring means for turning the valve to a closed position in the body, means for locking the valve in open position in the body, a spring controlled hook member pivoted upon the body and adapted to sustain a vessel at the discharge outlet thereof and engageable with the locking means to release the valve and a spring located in the path of movement of the hook member to render the initial movement thereof comparatively slow and the final movement thereof comparatively fast under the influence of the vessel and its contents.

2. In combination with a faucet body having a valve turnably mounted therein, spring means for turning the valve to a closed position in the body, means for locking the valve in an open position in the body, a spring controlled hook member pivoted to the body and engageable with the locking means to release the valve, a spring located in the path of movement of the hook member and having a hump disposed toward the pivot of the hook member to render the initial movement of the hook member comparatively slow and the final movement thereof comparatively fast under the influence of the vessel and the contents thereof.

3. In combination with a faucet body having a valve turnably mounted therein, spring means for turning the valve to a closed position in the body, means for locking the valve in an open position in the body, a bell crank lever fulcrumed adjacent the body, a hook member pivoted upon the body, a spring connecting the hook member with the bell crank lever, said hook member being engageable with the locking means to release the valve, and a lever fulcrumed adjacent the body and engageable with the arm of the bell crank lever to adjust the tension of the spring which connects the bell crank lever with the hook member.

4. In combination with a faucet body having a valve turnably mounted therein, spring means for turning the valve to a closed position in the body, means for locking the valve in an open position in the body, a hook member pivotally mounted upon the body and engageable with the locking means to release the valve, a bell crank lever fulcrumed adjacent the body, a spring connecting one arm of the bell crank lever with the hook member, a lever fulcrumed adjacent the body and engageable with the bell crank lever to adjust the tension of the said spring and another lever fulcrumed adjacent the body and engageable with the bell crank lever to still further adjust the tension of the spring which connects the bell crank lever with the hook member.

5. In combination with a faucet body having a valve turnably mounted therein, spring means for turning the valve to a closed position in the body, means for locking the valve in an open position in the body, a hook member pivoted upon the body and engageable with the locking means to release the valve, an indicator hand carried by the hook member, a plate having a graduation located adjacent the path of movement of the free end of the indicator hand, a bell crank lever fulcrumed adjacent the body, a spring connecting one arm of the bell crank lever with the hook member, a lever fulcrumed adjacent the body and engageable with the bell crank lever to adjust the tension of the spring and another lever fulcrumed adjacent the body and engageable with the bell crank lever to still further adjust the tension of the said spring.

6. In combination with a faucet body having a valve turnably mounted therein, spring means for holding the valve in a closed position in the body, means for locking the valve in open position in the body, a hook member pivotally mounted upon the body and engageable with the locking means to release the valve, a spring located in the path of movement of the hook member for rendering the initial movement of the member comparatively slow and the final movement thereof comparatively fast, a bell crank lever fulcrumed adjacent the body, a spring connecting one arm of the bell crank lever with the hook member, a lever fulcrumed adjacent the body and engageable with the bell crank lever to adjust the tension of the spring which connects the bell crank lever with the hook member, another lever fulcrumed adjacent the body and engageable with the bell crank lever to still further adjust the tension of the spring which connects the bell crank lever with the hook member, and a graduated scale positioned adjacent the path of movement of the last mentioned lever.

7. In combination with a faucet body having a valve turnably mounted therein, spring means for moving the valve to a closed position in the body, a disk mounted upon the valve and having a lug depending therefrom, an arm pivotally mounted and engageable with the lug to hold the valve in an open position, a hook member pivoted upon the body and engageable with the arm to swing the same and release the valve, and a spring connected with the hook member and normally holding the same out of engagement with the arm.

In testimony whereof I affix my signature in presence of two witnesses.

FREDERICK MARQUARDT.

Witnesses:
  M. E. LAUGHLIN,
  GEO. A. BYRNE.